United States Patent
Feurle et al.

(10) Patent No.: US 10,113,710 B2
(45) Date of Patent: Oct. 30, 2018

(54) REFLECTOR ELEMENT FOR AN LED CIRCUIT BOARD

(71) Applicant: ZUMTOBEL LIGHTING GMBH, Dornbirn (AT)

(72) Inventors: Helmut Feurle, Suzlberg (AT); Marcel Kilga, Goetzis (AT); Michael Spiegel, Dornbirn (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 228 days.

(21) Appl. No.: 14/786,915

(22) PCT Filed: Apr. 24, 2014

(86) PCT No.: PCT/EP2014/058381
§ 371 (c)(1),
(2) Date: Oct. 23, 2015

(87) PCT Pub. No.: WO2014/174034
PCT Pub. Date: Oct. 30, 2014

(65) Prior Publication Data
US 2016/0102840 A1    Apr. 14, 2016

(30) Foreign Application Priority Data

Apr. 26, 2013 (DE) .................. 20 2013 101 823 U

(51) Int. Cl.
*F21V 7/05* (2006.01)
*F21V 7/00* (2006.01)
(Continued)

(52) U.S. Cl.
CPC .................. *F21V 7/05* (2013.01); *F21V 7/00* (2013.01); *F21V 7/22* (2013.01); *F21V 17/164* (2013.01);
(Continued)

(58) Field of Classification Search
CPC ..... F21V 7/05; F21V 7/00; F21V 7/22; F21V 17/164; F21V 19/003; F21V 9/004
(Continued)

(56) References Cited

U.S. PATENT DOCUMENTS 2,387,804 A * 10/1945 Miskella .................. A61N 5/06
  219/553
4,245,280 A *  1/1981 Hartman ............ G03B 15/0442
  362/13

(Continued)

FOREIGN PATENT DOCUMENTS

CN      202581133      12/2012
DE    102007050893       4/2009
(Continued)

OTHER PUBLICATIONS

International Search Report for PCT/EP2014/058381, English translation attached to original, Both completed by the European Patent Office dated Jul. 21, 2014, All together 8 Pages.

*Primary Examiner* — Bryon T Gyllstrom
(74) *Attorney, Agent, or Firm* — Brooks Kushman P.C.

(57) ABSTRACT

A flat reflector element for planar arrangement on an LED circuit board has light-passage openings that correspond to the positions of the LEDs, wherein projecting contact protection elements are provided at the periphery of each of said light-passage openings.

17 Claims, 4 Drawing Sheets

(51) Int. Cl.
*F21V 17/16* (2006.01)
*F21V 19/00* (2006.01)
*F21V 7/22* (2018.01)
*F21S 8/00* (2006.01)
*F16B 21/06* (2006.01)
*F21Y 105/10* (2016.01)
*F21Y 115/10* (2016.01)

(52) U.S. Cl.
CPC .......... *F21V 19/003* (2013.01); *F21V 19/004* (2013.01); *F21V 19/0035* (2013.01); *F16B 21/065* (2013.01); *F21S 8/03* (2013.01); *F21Y 2105/10* (2016.08); *F21Y 2115/10* (2016.08)

(58) Field of Classification Search
USPC ........................................................ 362/341
See application file for complete search history.

(56) References Cited

U.S. PATENT DOCUMENTS

| | | | | |
|---|---|---|---|---|
| 4,254,453 | A * | 3/1981 | Mouyard | G09F 13/22 340/815.54 |
| 6,113,247 | A * | 9/2000 | Adams | F21V 7/00 362/237 |
| 8,104,909 | B2 * | 1/2012 | Shin | G02F 1/133608 362/23.19 |
| 8,683,683 | B2 | 4/2014 | Knoll et al. | |
| 9,127,814 | B2 * | 9/2015 | Nozawa | F21K 9/00 |
| 2006/0012991 | A1 * | 1/2006 | Weaver, Jr. | F21K 9/00 362/235 |
| 2007/0103925 | A1 * | 5/2007 | Henson | B60Q 1/0011 362/554 |
| 2009/0086508 | A1 * | 4/2009 | Bierhuizen | G02B 6/0018 362/617 |
| 2009/0273735 | A1 * | 11/2009 | Yeh | G02F 1/133603 349/67 |
| 2010/0008066 | A1 | 1/2010 | Moro et al. | |
| 2010/0208161 | A1 * | 8/2010 | Sasaki | G02F 1/133608 349/58 |
| 2011/0265540 | A1 * | 11/2011 | Boyer | F21V 7/005 72/335 |
| 2012/0294032 | A1 | 11/2012 | Chen | |

FOREIGN PATENT DOCUMENTS

| | | |
|---|---|---|
| EP | 2434196 | 3/2012 |
| GB | 2479142 | 10/2011 |
| JP | 2013015768 | 1/2013 |
| WO | 2012032998 | 3/2012 |
| WO | 2012172688 | 12/2012 |

* cited by examiner

REFLECTOR ELEMENT FOR AN LED CIRCUIT BOARD

CROSS-REFERENCE TO RELATED APPLICATION

This application is the U.S. national phase of PCT Application No. PCT/EP2014/058381 filed on Apr. 24, 2014, which claims priority to DE Patent Application No. 20 2013 101 823.6 filed on Apr. 26, 2013, the disclosures of which are incorporated in their entirety by reference herein.

The present invention relates to a flat reflector element which is intended to be used with an LED circuit board, in particular to cover said LED circuit board. In this case, a reflector element of this kind is intended to be employed, in particular, in luminaires in which the aim is to output light over an area with the aid of LEDs.

If LEDs are used for illumination purposes, it should be noted that LEDs have relatively small dimensions in comparison to conventional light sources such as fluorescent lamps or the like. LEDs are often also called punctiform light sources which are accordingly not optimally suitable for uniform light output over a relatively large area. In this case, it is necessary for a large number of LEDs to be arranged in a distributed manner, for example in the form of a matrix, on a circuit board, wherein a light-emission element is then arranged at a certain distance from the circuit board, this light-emission element having a light-scattering effect in such a way that the individual LEDs can no longer be identified as individual light points. Luminaires of this kind are now used in an extremely wide variety of forms.

In principle, there are two possible ways of operating the LEDs, depending on the way in which the LEDs are interconnected on the corresponding circuit board. Operation with a so-called protective extra-low voltage is known, in which case only a low voltage which is not dangerous if accidently touched is therefore applied to the LEDs themselves and to the feeding lines or conductor tracks. However, in this case, it is necessary to use special operating devices which are relatively expensive. Therefore, so-called high-voltage-operated LED circuit boards in which voltages which may possibly be dangerous to humans are applied to the corresponding lines are preferably used. Appropriate protection standards therefore prescribe that safety measures which ensure sufficient protection against electric shock have to be taken. This once again leads to additional measures since, however, high-voltage-operated LED circuit boards are generally more efficient and more cost-effective, but this nevertheless constitutes the preferred variant for LED operation. It should also be noted in this case that a certain amount of shielding of the LEDs against external influences, in particular against accidental contact, is generally required even when operating with a protective extra-low voltage, in order to prevent, in particular, so-called ESD (electrostatic discharge) damage.

Different variants are known from the prior art for realizing corresponding contact-protection. For example, solutions are known in which a clear plastic plate is placed within the luminaire in front of the LED circuit board. However, a component of this kind is expensive and may possibly have an adverse effect on the light output and therefore lead to a reduction in efficiency. Furthermore, encapsulation of the LED circuit board is known from the prior art. In this case, the circuit board is inserted into a housing which is screwed to the transparent cover, as a result of which a so-called light engine is formed. Said light engine is, in turn, snapped into the actual box-like luminaire housing, so that a double-walled housing construction is formed, this preventing accidental contact with the LED circuit board. In order to increase efficiency, a highly reflective foil is placed directly on the LED circuit board in this case, said highly reflective foil once again reflecting the light which is reflected back within the light engine and directing said light in the direction of the light-exit surface of the luminaire. This second variant is also relatively complicated in terms of design and requires a relatively deep configuration of the luminaire housing.

The present invention is therefore based on the object of providing a novel solution for forming appropriate contact-protection for LED circuit boards which can be implemented in a relatively cost-effective manner and nevertheless is at least comparable with the known solutions in terms of its light-related properties.

This object is achieved by a flat reflector element which has the features of claim 1. Advantageous developments of the invention are the subject matter of the dependent claims.

Instead of the above-described solutions, the invention proposes a reflector element which, like the reflective foil which is known from the prior art, is arranged in a planar manner directly on the LED circuit board. In this case, the reflector element has openings which correspond to the positions of the LEDs, wherein it is provided according to the invention that projecting contact-protection elements are arranged at the periphery of each of these light-passage openings.

Therefore, according to the present invention, a flat reflector element for planar arrangement on an LED circuit board is proposed, wherein the reflector element has light-passage openings which correspond to the positions of the LEDs, and projecting contact-protection elements are arranged at the periphery of each of the light-passage openings.

In comparison to a simple reflective foil, the reflector element according to the present invention is therefore structured, and therefore it on the one hand allows the required light emission but on the other hand prevents the LEDs or the voltage-carrying solder points for the LEDs from being accidentally touched. Since all further elements of the LED circuit board are generally covered by the reflector element, there is also no risk of the conductor tracks or other current-carrying lines being accidentally touched, and therefore this provides reliable protection against an electric shock. At the same time, the inability to touch the LEDs ensures that electrostatic discharges cannot lead to the abovementioned ESD damage.

By way of example, the contact-protection elements according to the invention can be formed by ribs which are arranged in a manner distributed over the periphery of the light-passage openings, wherein four ribs are preferably provided in each case. The passage of the light which is emitted by the corresponding LED can in this case be improved when the ribs are designed to taper in the direction of the associated light-passage opening. Furthermore, the light-passage openings can be in the form of a funnel or have a funnel-shaped edge region in order to disturb the output of light only in as small a solid angle range as possible.

According to a further advantageous development of the invention, the reflector element is formed in such a way that it can be fastened to the circuit board or connected to said circuit board, in order to form one unit. In particular, means for latching to the LED circuit board can be provided for this purpose, said means preferably being designed in such a way that the connection between the reflector element and the circuit board can be broken only in a very complicated manner. By way of example, a plurality of latching arms which each pass through a latching opening which is provided in the circuit board can be provided for this purpose. In this case, these latching pins may, if appropriate, also be dimensioned in such a way that they additionally also pass through a mounting surface of the associated luminaire housing, and in this way the entire arrangement comprising the reflector element and the LED circuit board is fastened to the luminaire housing. In this case, it is particularly advantageously provided that the latching arms can be locked with the aid of locking pins which are injection-molded onto the reflector element itself as tear-off elements. Therefore, no additional elements which are necessary for connection between the reflector element and the LED circuit board are required. Instead, the connection between units can be made without tools, and therefore ultimately a unit is created by means of which the LED light can be output in an efficient manner and the required contact-protection is provided at the same time.

This joined construction can then be arranged in the housing of a luminaire without additional protective measures, so that the corresponding expenditure is considerably reduced in comparison to the solutions known to date. In this case, the reflector element also performs the function of the highly reflective foil used in the prior art at the same time. That is to say, light beams which are reflected back within the luminaire and strike the reflector element are again deflected in such a way that they can further be used to output light. The efficiency of the solution according to the invention is therefore in any case equivalent to constructions known from the prior art. The reflector element according to the invention is accordingly preferably composed of a highly reflective plastic material and can be produced, for example, by injection-molding or the like and may also possibly be provided with a reflective coating at a later time.

The invention will be explained in greater detail below with reference to the appended drawing, in which.

Figure 1:
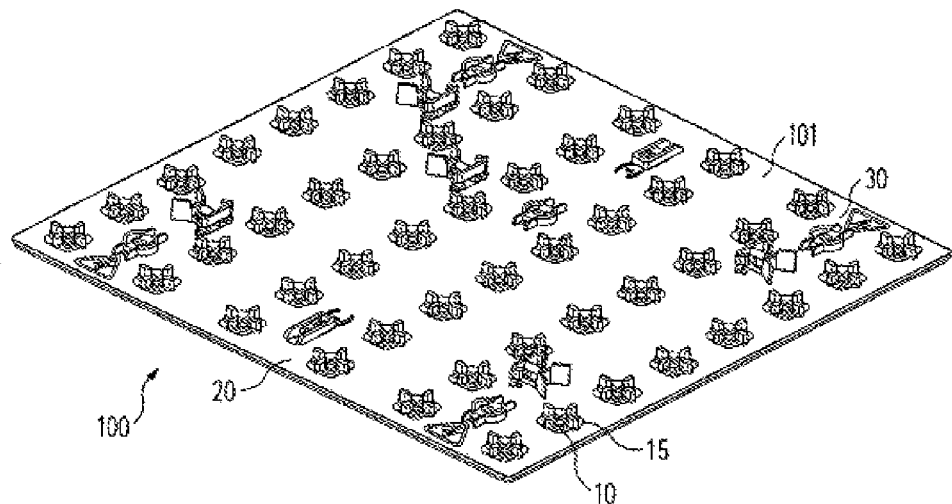
FIG. 1 shows a view of a reflector element according to the invention.

The reflector element according to the invention which is illustrated in FIG. 1 and is provided in general with reference symbol 100 is intended to fulfill two functions, as already mentioned. Firstly, an underlying LED circuit board should be reliably covered in such a way that contact-protection and therefore protection against electric shocks is provided, wherein it goes without saying that the output of light by the LEDs should be adversely affected as little as possible. At the same time, the element 100 serves as a conventional reflector. That is to say, light beams which are returned within a luminaire housing should be reflected by the reflector element 100 in such a way that they can be used for outputting light as before. As a result, the efficiency of the entire luminaire should be increased.

The reflector element 100 is accordingly of reflective design on its side or surface which faces the light-emission opening of the luminaire, said side or surface being illustrated in FIG. 1. Said reflector element is preferably a plastic component which has been produced by injection-molding and is provided with a suitable reflective coating.

In order to reliably protect the LED circuit board, it is firstly necessary for it to be impossible for the LEDs or the associated LED solder points to be accidentally touched. Furthermore, it goes without saying that it should not be possible to touch the further conductor tracks or components which run on the LED circuit board and likewise carry a high voltage either. Therefore, the dimensions of the reflector element are preferably matched to the dimensions of the LED circuit board, wherein, in the case of a planar arrangement of a plurality of circuit boards, it would possibly also be feasible for one reflector element to cover and therefore protect a plurality of circuit boards at the same time. However, for the sake of simplicity, it is assumed in the text which follows that precisely one LED circuit board, which is situated beneath the reflector element 100 and has identical dimensions, is associated with said reflector element.

Figure 2:
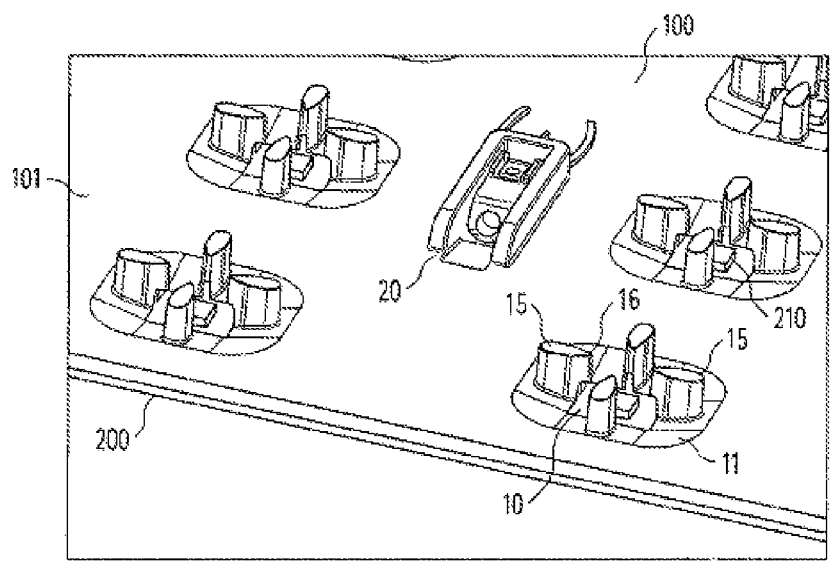
FIG. 2 shows an enlarged illustration of the reflector element from FIG. 1.

The important components on the surface 101 of the reflector element 100 are clearly shown in FIG. 1 and the enlarged illustration of FIG. 2. In this case, it is important for light-passage openings which correspond to the positions of the LEDs on the circuit board to be formed. As is clear from FIG. 2, each light-passage opening 10 is positioned in such a way that, if the reflector element 100 rests directly on the surface of the circuit board 200, the associated LED 210 projects into the passage opening 10. In this case, the light-passage opening 10 is dimensioned in such a way that a certain safety distance remains at the outer periphery of each LED 210, so that no damage can occur during mounting of the reflector element 100 and connection to the circuit board 200. However, at the same time, the dimensions of the remaining free edge region should also not be excessively large, in order to be able to ensure the desired contact-protection.

Figure 3:
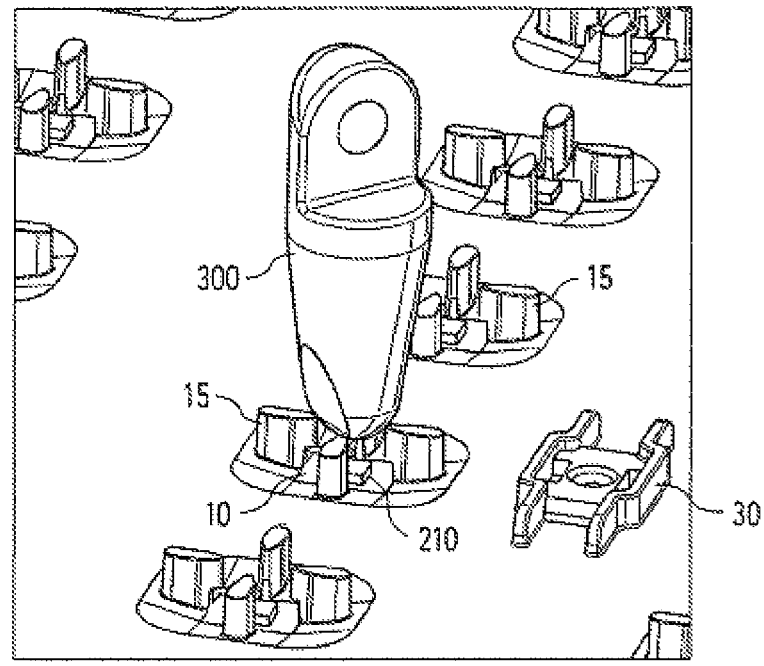
FIG. 3 shows an illustration of the contact-protection which is provided with the aid of the contact-protection elements in the reflector element according to the invention.
Figure 4:
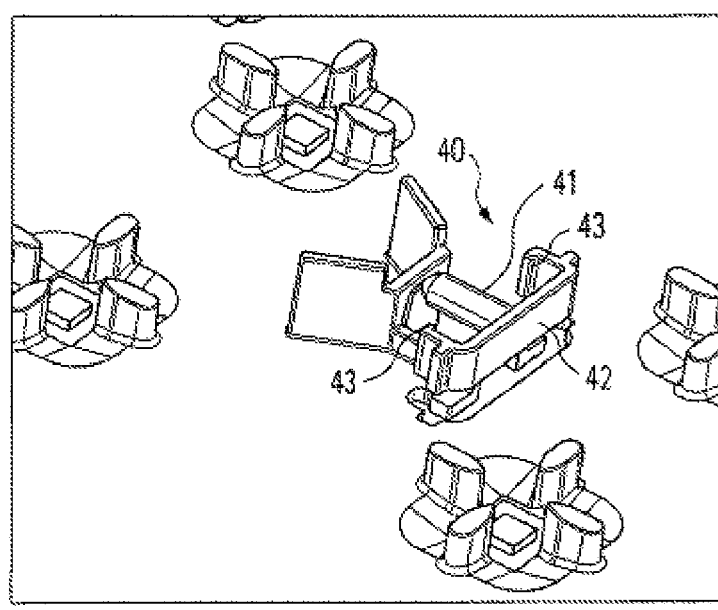
FIGS. 4 to 6 show illustrations for using the latching elements, which are provided on the reflector element, for connection to the LED circuit board.

This contact-protection is implemented by a plurality of contact-protection elements 15 being arranged on the outer periphery of each passage opening 10. In the illustrated exemplary embodiment, the contact-protection elements 15 are formed by four ribs which are arranged in a manner distributed over the periphery of the opening 10. Said ribs project slightly from the surface 101 of the reflector element 100 and are dimensioned in such a way that contact with the LED 210 or the solder point which is associated with the LED 210 is not possible. According to the associated standard, it is necessary to ensure in this case that a so-called test finger 300, illustrated in FIG. 3, of which the dimensions are standardized, cannot come into contact with the LED 210 or the current-carrying regions independently of its orientation. To this end, the ribs 15 have to have a corresponding height and also be at a corresponding sufficiently small distance from one another, so that—as illustrated in FIG. 3—the tip 301 of the test finger 300 is blocked by the ribs 15 in each case. Since all further elements of the underlying LED circuit board 200 are covered by the reflector element 100 in any case, accidental contact with the surface of the LED circuit board 200 is therefore prevented, and therefore there is firstly no risk of electric shocks even in the case of high-voltage-operated LED circuit boards. Secondly, accidental ESD damage to the LEDs 210 is avoided.

It goes without saying that the protective measures provided, in particular the contact-protection ribs 15, should have as little an adverse effect on the output of light as possible. To this end, two measures which are shown in FIG. 2 are provided. Firstly, the end regions 16 of the contact-protection ribs 15, which end regions face the LEDs 210 or the light-passage opening 10, are designed to taper. Secondly, each light-passage opening 10 has a funnel-shaped edge region 11. Since light is output in a relatively large angular range by the LEDs 210, an at least small influence on the output of light by the contact-protection element 15 cannot be prevented. However, the described measures lead to the influence being kept extremely small.

It goes without saying that it would also be feasible to design the contact-protection elements in another way or to vary the number of contact-protection elements, as long as accidental contact with the LEDs is precluded, as before.

The components which are responsible for light output and contact-protection, that is to say the passage openings 10 and the contact-protection ribs 15, constitute the important constituent parts of the reflector element 100 according to the invention. However, at the same time, the reflector element 100 has further special features which are to be explained in greater detail below.

Firstly, LED circuit boards with which contact is made from the upper side, that is to say that side on which the LEDs 210 are also arranged, are generally used. In this case—as shown in FIG. 2—, appropriate connection terminal regions 20 by means of which corresponding contact can be made with the underlying LED circuit board 200 are formed at the corresponding positions of the reflector element 100. Therefore, the LED circuit board 200 does not have to be modified in this respect.

Furthermore, it is preferably provided that the reflector element 100 is connected to the circuit board 200 in such a way that a fixedly joined unit which cannot be readily separated again is formed. It should be possible to remove the reflector element 100 from the circuit board 200 again only with a great deal of effort, so that the corresponding protection requirements are also met in this respect.

In this case, it is provided according to a particularly preferred exemplary embodiment of the invention that the reflector element 100 itself provides the corresponding means for connection between the LED circuit board 200 and the reflector element 100. Appropriate latching elements which are locked by means of additional locking pins are used for this purpose.

Figure 5:
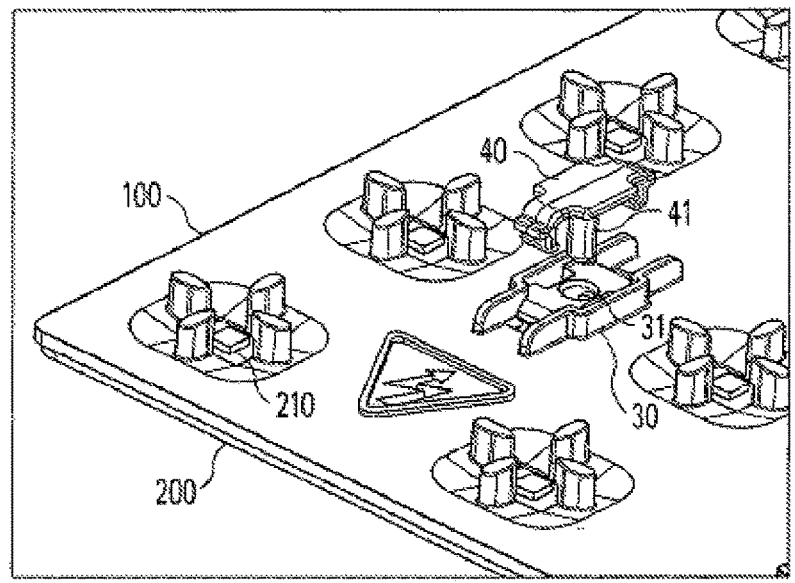
Figure 6:
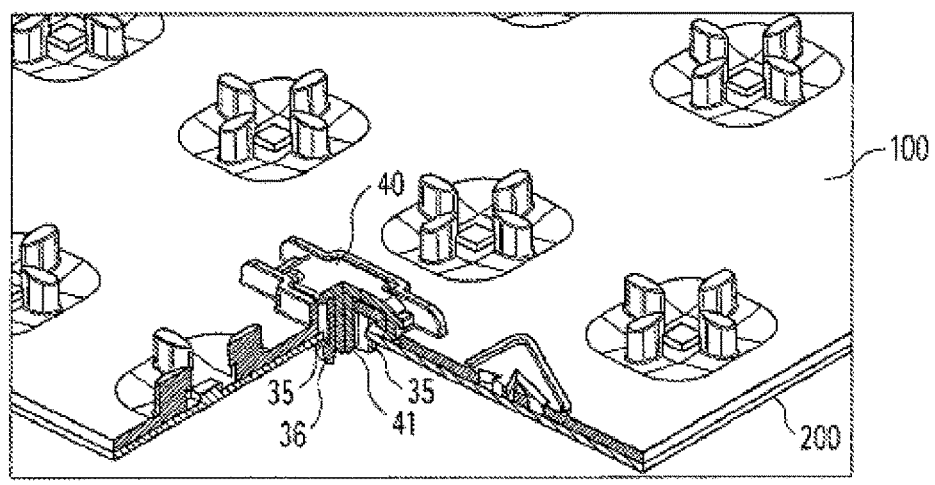

These—in the present example four—latching elements are initially provided with reference symbol 30 in FIG. 1. A latching element 30 is shown in greater detail in FIG. 3 or FIG. 5 for example. In this case, the corresponding latching element 30, as seen from the upper side, first has an opening 31 which is used for inserting a special locking pin. However, according to the sectional illustration of FIG. 6, latching to the underlying LED circuit board 20 is first achieved by each latching element 30 having downwardly projecting latching arms 35 with an end-side projection 36 which also projects outward. When the reflector element 100 is mounted on the LED circuit board 200, these latching arms 35 pass through a corresponding opening in the LED circuit board 200 and then engage behind said LED circuit board by way of their projections 36. In this way, a latching connection between the reflector element 100 and the circuit board 200 is achieved in a first step. In order to prevent the unit which is formed in this way from becoming detached, additional locking pins 40 are provided which are preferably provided by the reflector element 100 itself. These pins 40 are therefore injection-molded onto the reflector element 100 and can be removed by simply being torn off. It goes without saying that the number of locking pins 40 provided is exactly equal to the number of latching elements 30 provided on the reflector element 100.

After a locking pin 40 is torn off, it is inserted by way of its journal-like region 41, from the upper side, into the opening 31 in the latching means 30. In the process, said locking pin pushes the locking arms 35 outward, so that said locking arms can no longer pivot back and can therefore release the locking to the LED circuit board 200. At the same time, the locking pin 40 has an upper transverse web 42 with latching projections 43 formed at its two ends. When the locking pin 40 is inserted, said latching projections engage behind corresponding projections on the latching means 30, so that the locking pin 40 can no longer be withdrawn without a great deal of effort either. Ultimately, separation of the unit comprising the reflector element 100 and the LED circuit board 200 is therefore then only further possible with a great deal of effort.

It should be noted that said locking pins 40 could of course also be provided as separate components. However, arrangement on the reflector element 100 ensures that the means which are required for locking between the reflector element 100 and the LED circuit board 200 are immediately available.

Figure 7:
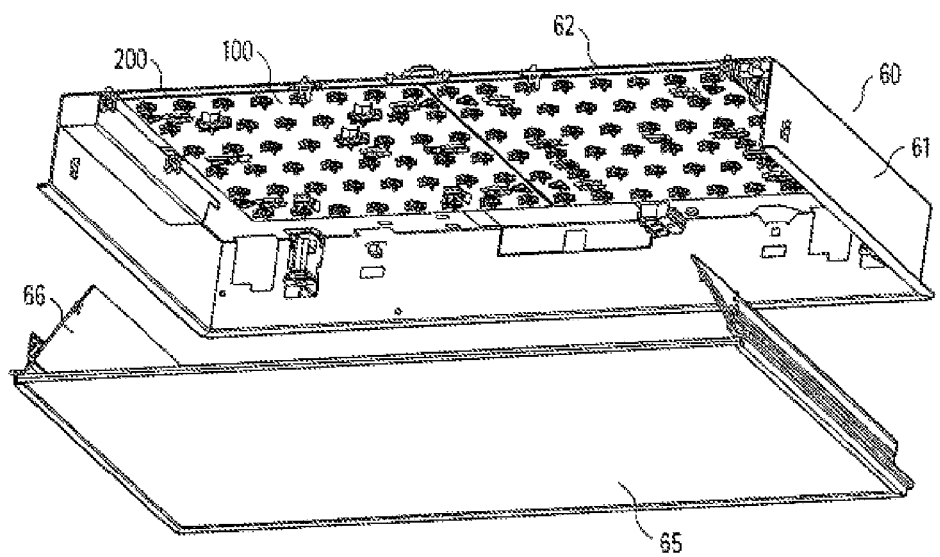
FIGS. 7 and 8 show views of a luminaire having a unit comprising an LED circuit board and a reflector element according to the invention.
Figure 8:
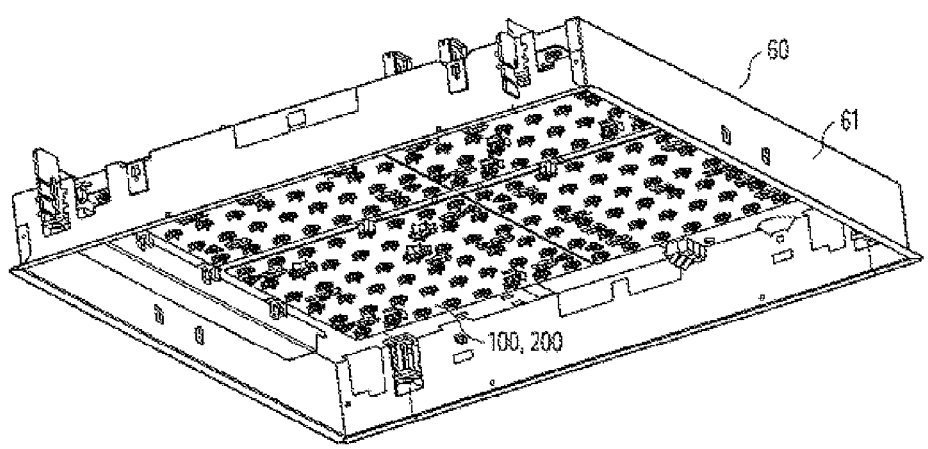

The unit comprising the reflector element 100 and the underlying LED circuit board 200 can then be inserted into a luminaire housing, as shown in the illustrations in FIGS. 7 and 8. Said figures show an add-on luminaire 60 with a box-like luminaire housing 61 which is closed by a light-emission element 62 at its light-exit opening. In the illustrated exemplary embodiment, four circuit boards with associated reflector elements 100 are fastened to the bottom face 62 of the luminaire housing. It is therefore preferably provided that the abovementioned latching means, in particular the latching arms 35, can also be used to anchor to the luminaire housing 60 at the same time. The latching arms 35 therefore additionally also pass through further corresponding openings in the bottom face 62 of the housing 60 and are then subsequently blocked by means of said locking pins 40. Therefore, the unit is additionally also secured to the housing 60, without further fastening measures being required.

Reflectors 66 which are inclined laterally inwardly extend from the light-exit element 65 to the bottom face 62 of the housing to the respective edge of the reflector element/LED circuit board unit. Light beams which are reflected back and run in the hollow space formed as a result of the above are then again returned by the reflective surface of the reflector element 100, so that said light beams can be output via the transparent light-exit element 65, as before. The homogeneity of the output of light by the luminaire 60 is improved by these multiple reflections at the same time.

Since the reflector element and the associated LED circuit board form a virtually captive unit, further protective measures for the circuit boards can be dispensed with. It is therefore obvious that a very simple and therefore cost-effective design for LED luminaires of this kind is obtained in this way. However, at the same time, the light-output properties of the solution according to the invention should be considered to be at least equivalent to the solutions known to date.

The invention claimed is:

1. A reflector element for planar arrangement on an LED circuit board, comprising:
  a flat reflector element having a plurality of light-passage openings which correspond to positions of LEDs, each light-passage opening having a funnel-shaped edge region, and
  a plurality of projecting contact-protection elements arranged at a periphery of each of the light-passage openings projecting away from a surface of the reflector element so as to at least partially cover the respective funnel-shaped edge region.

2. The reflector element as claimed in claim 1, wherein the contact-protection elements of each of the light-passage openings are formed by four ribs which are arranged in a manner distributed about the periphery of the respective light-passage openings.

3. The reflector element as claimed in claim 2, wherein the ribs are designed to taper in a direction projecting away from the surface.

4. The reflector element as claimed in claim 1, wherein said surface on said flat reflector element is composed of a highly reflective material.

5. The reflector element as claimed in claim 4, wherein said surface on said flat reflector element is composed of a highly reflective plastic material.

6. The reflector element as claimed in claim 1, wherein said flat reflector element has means for latching to the LED circuit board.

7. The reflector element as claimed in claim 6, wherein the means for latching comprise latching arms which pass through a latching opening which is provided in the circuit board.

8. The reflector element as claimed in claim 7, wherein the latching arms are dimensioned in such a way that they also pass through a latching opening, which is provided in a mounting surface of a luminaire housing, at the same time.

9. The reflector element as claimed in claim 7, wherein the means for latching further comprise locking pins which lock the latching arms in a latched position.

10. The reflector element as claimed in claim 9, wherein the locking pins are injection-molded onto the reflector element as tear-off elements.

11. A combination comprising an LED circuit board and a reflector element as claimed in claim 1.

12. A luminaire having a luminaire housing and an LED circuit board which is arranged in said luminaire housing, wherein a reflector element as claimed in claim 1 is arranged on the LED circuit board.

13. The luminaire as claimed in claim 12, wherein the LED circuit board is fastened to the luminaire housing by means of the reflector element.

14. The luminaire as claimed in claim 12, wherein each light-passage opening is dimensioned in such a way that a safety distance remains at an outer periphery of each LED.

15. The flat reflector element as claimed in claim 1, wherein each funnel-shaped edge region extends down to the respective light-passage opening.

16. The flat reflector element as claimed in claim 1, including a first and a second light-passage openings, and a first and a second groups of projecting contact-protection elements which are arranged respectively at the peripheries of the first and second light-passage openings, wherein the flat reflector element further includes a planar region which extends between the first and second groups of projecting contact-protection elements, the planar region being deprived of light-passage opening.

17. A flat reflector element for planar arrangement on an LED circuit board, wherein the flat reflector element includes:

a flat portion having light-passage openings which extend therethrough and which correspond to positions of LEDs, each light-passage opening having a respective funnel-shaped edge region which extends within a thickness of the flat portion, and projecting contact-protection elements which are arranged at a periphery of each of the light-passage openings so as to cover at least partially the respective funnel-shaped edge region.

* * * * *